United States Patent
Davi et al.

(10) Patent No.: US 8,011,492 B2
(45) Date of Patent: Sep. 6, 2011

(54) DEVICE FOR THE ACCUMULATION AND RELEASE OF PRODUCTS, ESPECIALLY PRODUCTS ARRANGED IN RANKS FEEDING PACKAGING LINES FOR SUCH PRODUCTS

(75) Inventors: Daniele Davi, Ferrara (IT); Rino Vitali, Copparo (IT)

(73) Assignee: CT Pack s.r.l., Fossalta di Copparo (FE) (IT)

( * ) Notice: Subject to any disclaimer, the term of this patent is extended or adjusted under 35 U.S.C. 154(b) by 65 days.

(21) Appl. No.: 12/449,417

(22) PCT Filed: Jan. 31, 2008

(86) PCT No.: PCT/EP2008/051210
§ 371 (c)(1),
(2), (4) Date: Aug. 7, 2009

(87) PCT Pub. No.: WO2008/095861
PCT Pub. Date: Aug. 14, 2008

(65) Prior Publication Data
US 2010/0108464 A1 May 6, 2010

(30) Foreign Application Priority Data
Feb. 9, 2007 (IT) .............................. PD2007A0043

(51) Int. Cl.
*B65G 37/00* (2006.01)
(52) U.S. Cl. .................................................. 198/347.1
(58) Field of Classification Search ................ 198/347.1
See application file for complete search history.

(56) References Cited

U.S. PATENT DOCUMENTS

| | | | | |
|---|---|---|---|---|
| 4,634,333 A | * | 1/1987 | Butterly et al. | 414/331.07 |
| 5,547,329 A | * | 8/1996 | Hirai et al. | 198/347.1 |
| 5,636,722 A | * | 6/1997 | Koop | 198/347.1 |
| 5,735,380 A | | 4/1998 | Schneider et al. | |
| 6,688,454 B2 | * | 2/2004 | Cho et al. | 198/347.1 |
| 7,201,270 B2 | * | 4/2007 | Moeller | 198/347.1 |
| 2006/0201785 A1 | * | 9/2006 | Moeller | 198/347.1 |
| 2010/0307889 A1 | * | 12/2010 | Philipp | 198/347.1 |

FOREIGN PATENT DOCUMENTS

| | | |
|---|---|---|
| DE | 195 06 196 A1 | 8/1995 |
| EP | 1 586 520 A1 | 10/2005 |
| EP | 1 818 292 A1 | 8/2007 |

OTHER PUBLICATIONS

International Search Report, Form PCT/ISA/210, 2 pages, for International Application No. PCT/EP2008/051210 completed on Apr. 23, 2008 and mailed Jul. 2, 2008.

* cited by examiner

*Primary Examiner* — James R Bidwell
(74) *Attorney, Agent, or Firm* — James C. Eaves, Jr.; James M. Francis; Greenebaum Doll & McDonald PLLC

(57) ABSTRACT

A device for the accumulation and release of products arranged in ranks within containers having sequentially loaded and discharged compartments, comprising an accumulation buffer with corresponding openings for receiving and delivering products and means for guiding the containers between the openings. The device uses pushers to push products out of the containers and onto at least one corresponding conveyor. Alternatively, where two independent pushers are utilized, the conveyor is repositionable at heights capable of receiving product sequentially displaced by each pusher by cycling the conveyor position to match the height of the currently actuated pusher. The discharge movement of each pusher is controlled so as to allow adequate time for the conveyor to reposition to the next sequentially actuated pusher so as to receive the products in a properly spaced arrangement onto a single conveyor.

13 Claims, 12 Drawing Sheets

DEVICE FOR THE ACCUMULATION AND RELEASE OF PRODUCTS, ESPECIALLY PRODUCTS ARRANGED IN RANKS FEEDING PACKAGING LINES FOR SUCH PRODUCTS

TECHNICAL FIELD

This invention relates to a device for the accumulation and release of products arranged in ranks, especially for feeding packaging lines for such products, having the characteristics specified in the precharacterising clause of the main claim no. 1.

TECHNICAL BACKGROUND

Devices of the abovementioned type are particularly if not exclusively used in packaging lines for confectionery products, such as chocolate bars, biscuits or others of similar type in which such products are moved on transport lines arranged in ranks or groups of ranks spaced apart (in this context by ranks are meant rows of products in line, in which these lines are arranged perpendicularly to the direction of advance of the products). Between these transport lines and the packaging machines there is typically an intermediate buffer for the accumulation of products, whose main function is to ensure a regular feed to the packaging machine at a predetermined uniform rate and thus render the feed independent of the speed of the ranks arriving and variations in their flow.

With such accumulation buffers it is then possible to effectively feed different automatic packaging lines at speeds and feed rates programmed in relation to the nature of the products being processed.

One example of such a device for the accumulation and release of products is known from the international patent application published under no. WO2004/087543 in the name of the same Applicant.

Typically these accumulation devices comprise a store within which a plurality of container elements are supported and conveyed along a path which optimises the accumulation capacity. Each container comprises a plurality of shelves capable of supporting and containing corresponding ranks of the products fed to the buffer.

The path along which the containers move within the buffer is selected in such a way that each container is sequentially led to a receiving opening to load one or more ranks of the products arriving at the buffer on each of the shelves and at the same time or not at the same time a previously loaded container is passed by appropriate conveyance means, for example of the chain type, to the delivery or discharge opening for release of the products leaving the buffer.

A typical path for the movement of containers in the buffer capable of optimising accumulation capacity provides for an ascending vertical section in which containers are loaded in sequence through the receiving opening and an opposite and parallel descending vertical section in which the containers are conveyed to the delivery opening in order to discharge products from the buffer. These two vertical sections are connected by corresponding respective horizontal sections to define an overall path of a square shape with pairs of opposite sections parallel to each other as for example illustrated in the earlier PCT patent application mentioned above. Containers filled with products are accumulated side by side in the upper horizontal section while containers which have previously been emptied are accumulated again side by side in the lower horizontal section.

In this type of device provision is also made on discharging from the buffer for pusher means for moving the ranks of products from each supporting plane in the container being emptied onto an outgoing conveyor belt. The pusher means is therefore designed to move transversely to the direction of movement of the container being discharged, backwards and forwards with respect to the same, along a first course in one direction to come into contact with the rank of products which have to be discharged and then again moved away from the container along a return course in the opposite direction. Obviously the fact that these stages in movement of the pusher means must be repeated for each shelf in the container has an effect on the speed and rate at which the ranks of products are discharged, and therefore constitutes a limit to the overall productivity of the unit, which in such applications cannot be reconciled with high speeds (understood as the number of ranks delivered per unit time) expected downstream from the accumulation buffer in the packaging lines.

Another similar limitation which is encountered in devices of the known type is associated with the speed with which the buffer is fed, which in this case is influenced by the times required for moving the container being loaded and the frequency with which the ranks loaded in sequence are fed to the shelves of a given container.

DISCLOSURE OF THE INVENTION

The principal object of the invention is to provide a device for accumulating and releasing products arranged in ranks, structurally and functionally designed so as to overcome the limitations mentioned with reference to the cited known art. These and other objects which will be clearly apparent below are accomplished through the invention by means of a device for the accumulation and release of products constructed in accordance with the following claims.

BRIEF DESCRIPTION OF THE DRAWINGS

Other advantages and characteristics of the present invention will become clear from the following detailed description which is given with reference to the appended drawings which are provided purely by way of non-limiting example and in which.

PREFERRED EMBODIMENTS OF THE INVENTION

Figure 1:
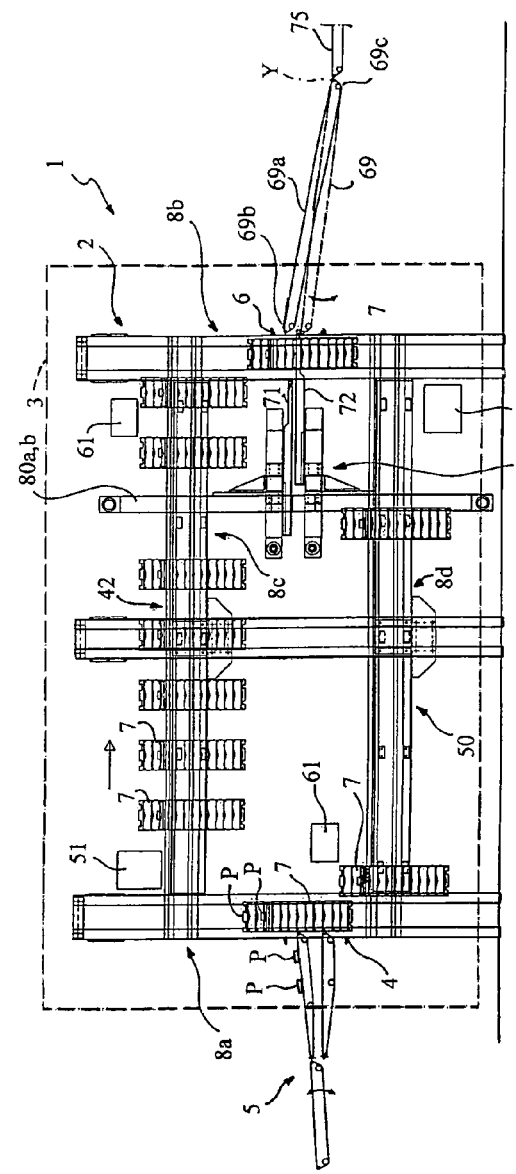
FIG. 1 is a diagrammatical view of an accumulation device according to this invention in lateral elevation.
Figure 2:
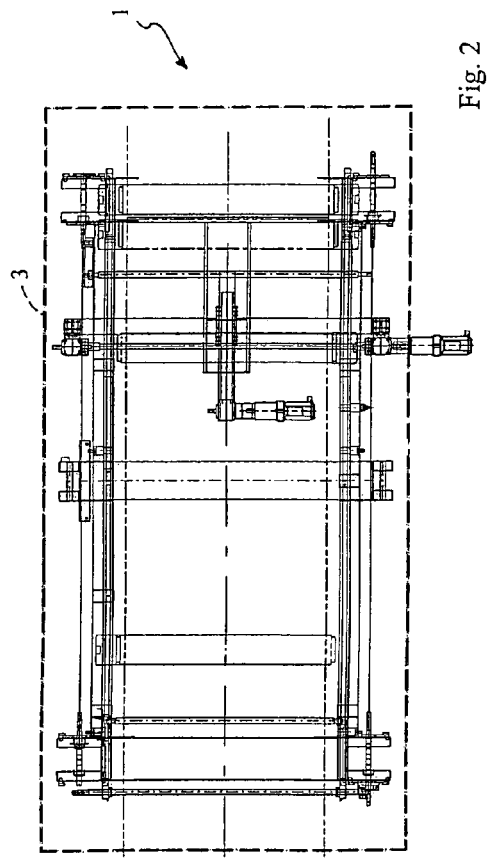
FIGS. 2 and 3 are respectively plan and front elevation views of the device in FIG. 1, FIGS. 4 and 5 are diagrammatical perspective views of corresponding details of the device in the preceding figures.
Figure 3:
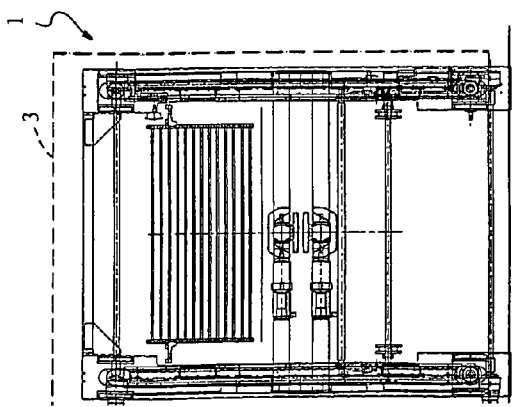
Figure 4:
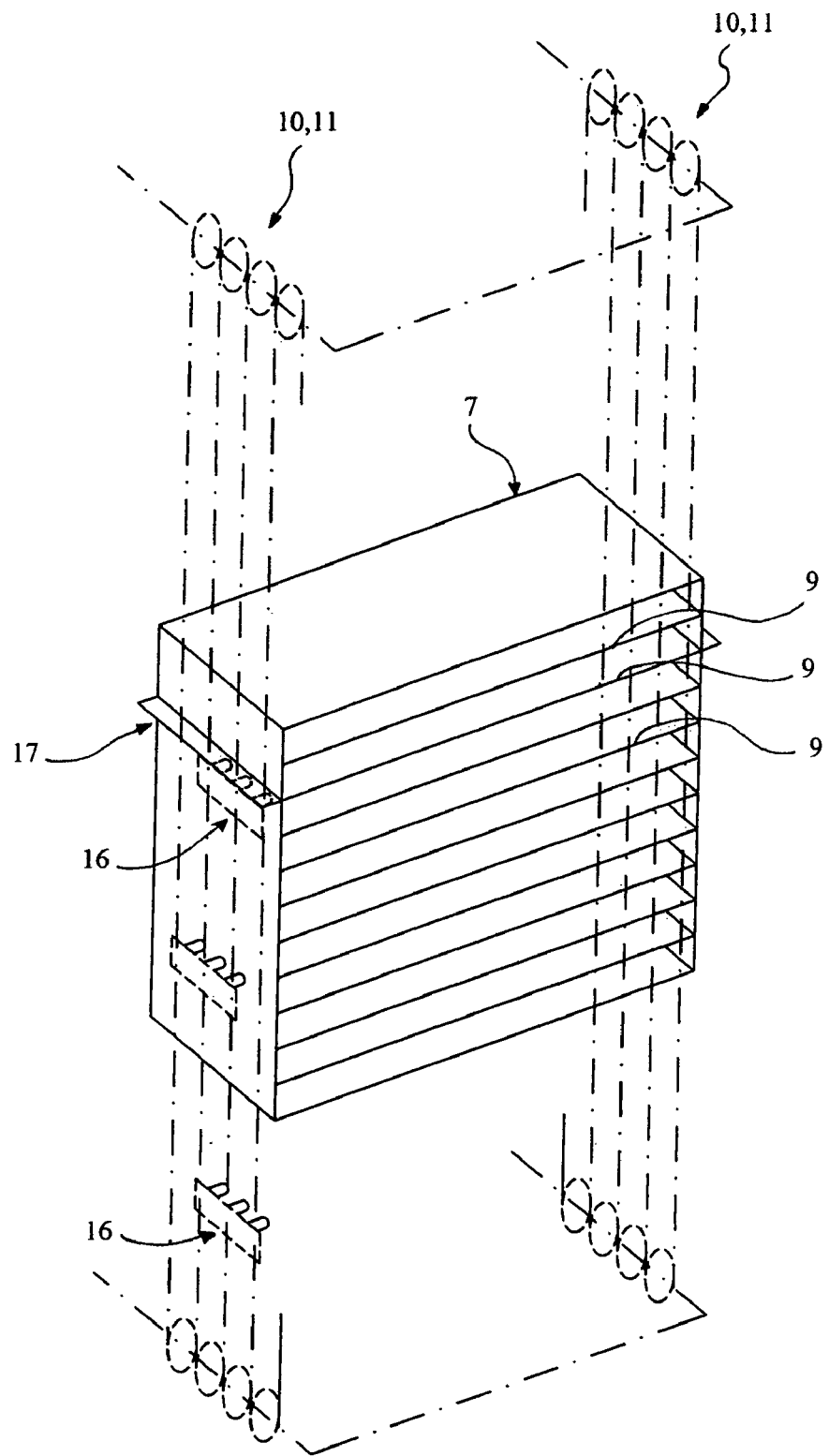
Figure 5:
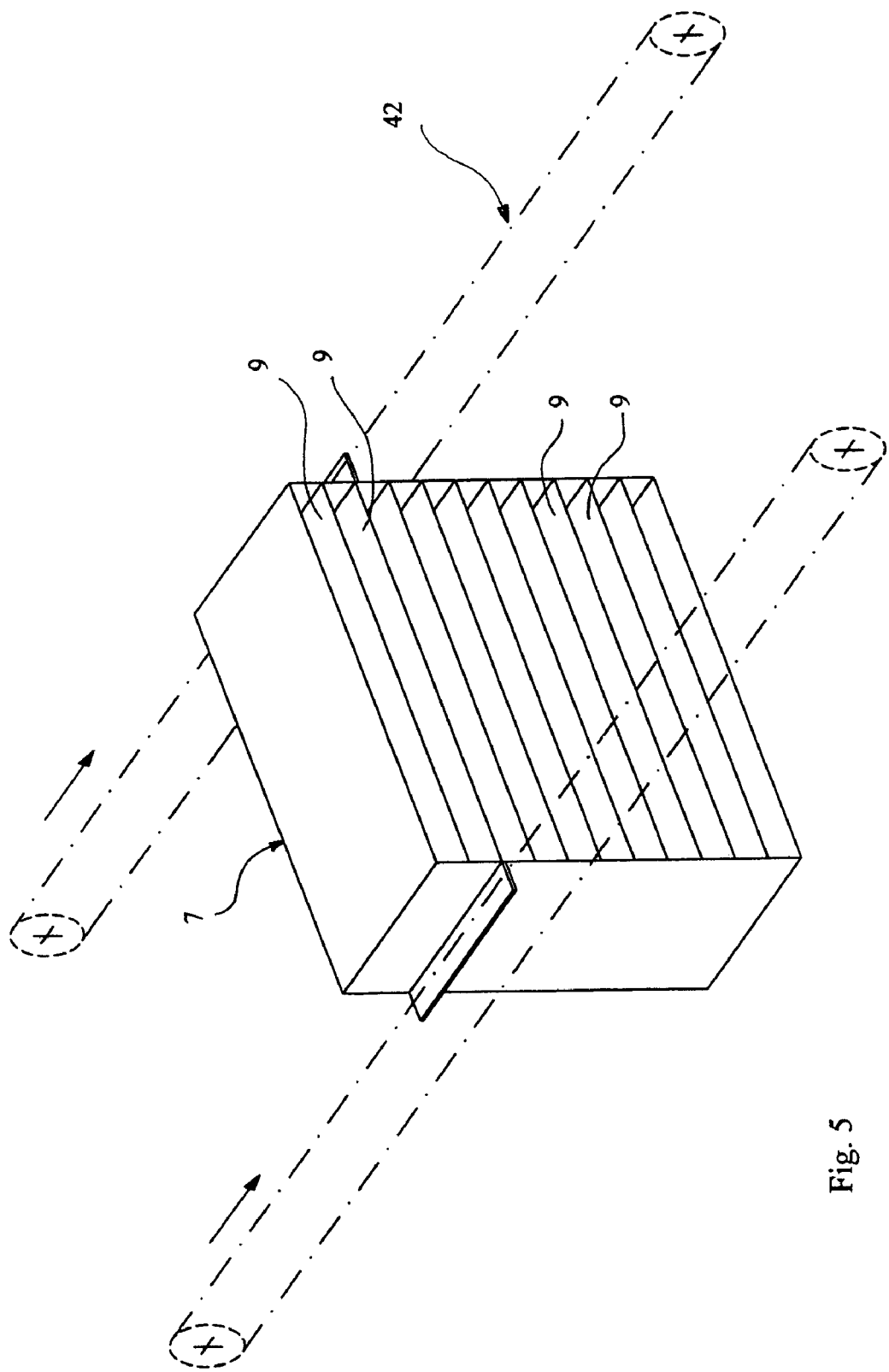
Figure 6:
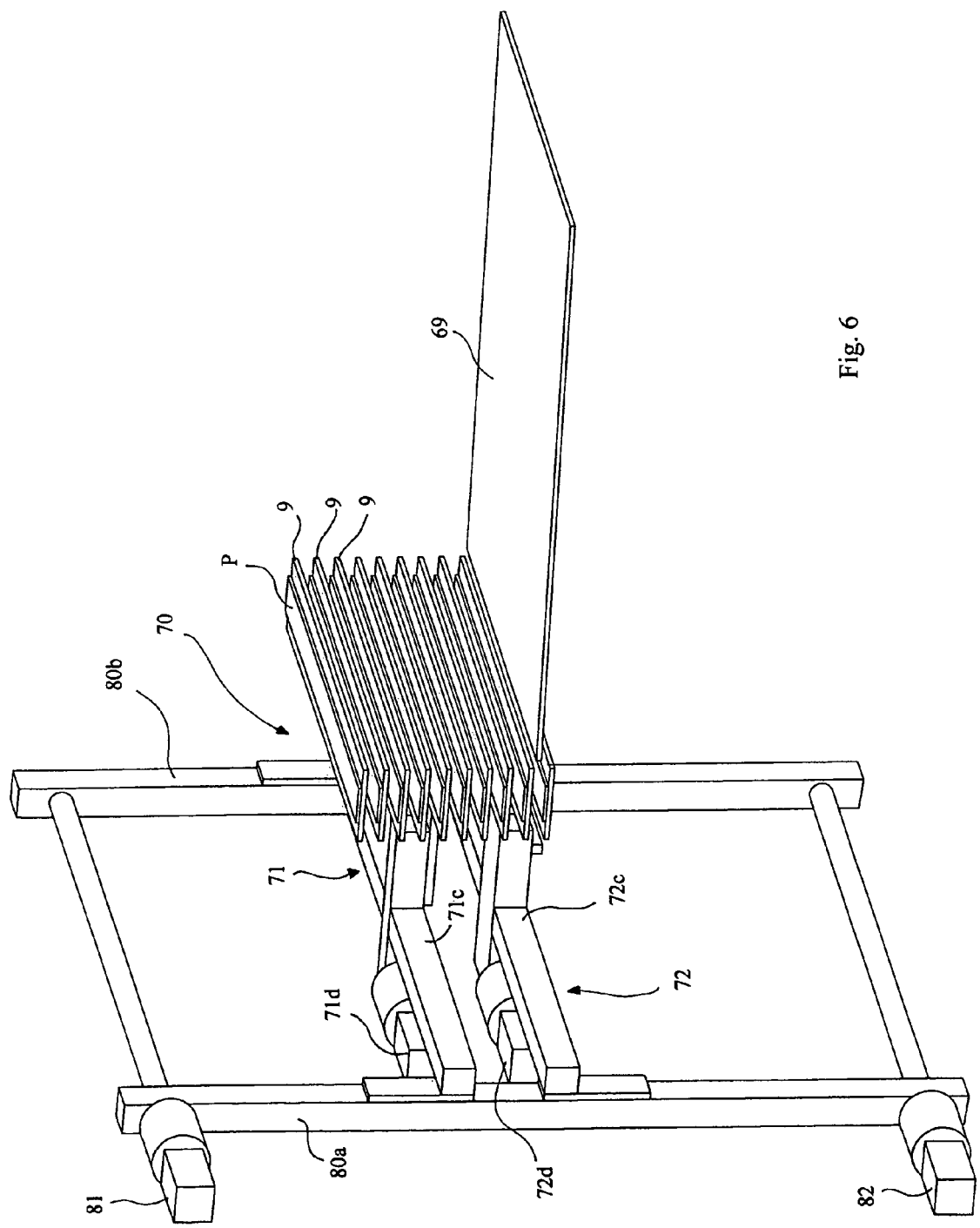
FIGS. 6 and 7 are partly diagrammatical perspective views of another detail of the device according to the invention.
Figure 7:
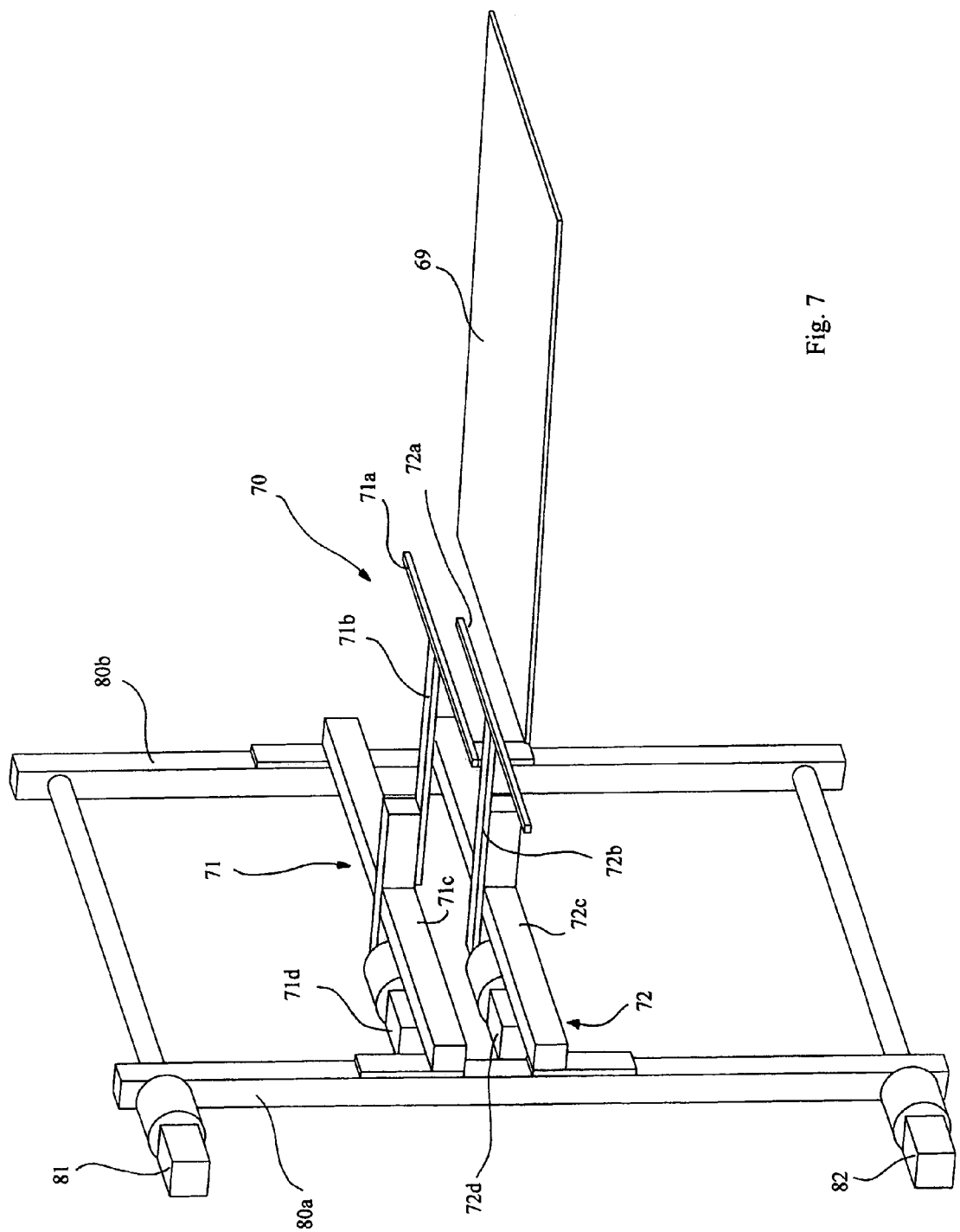

With reference to the figures mentioned, 1 indicates as a whole a device for the accumulation and release of products P arranged in ranks constructed according to this invention. The device is of the type comprising a buffer 2 supported by a fixed structure not illustrated in the figures, the outer containing body or enclosure of which 3 is diagrammatically shown by dashed lines in the views in FIGS. 1 to 3.

Accumulation buffer 2 is provided with a receiving opening 4 through which products P arranged in ranks are inserted on arrival on feed conveyor means, indicated as a whole by 5, and a delivery opening 6 for the release of products P leaving buffer 2.

Accumulation device 1 also comprises a plurality of container elements 7 which are guided so as to move within buffer 2 between openings 4 and 6 along a closed ring-shaped path 8 defined by four corresponding straight sections indicated by 8a, 8b, 8c and 8d. More particularly path 8 conveniently has a rectangular configuration with pairs of sections 8a, 8b and 8c, 8d parallel and opposite to each other. Sections 8a and 8b also extend vertically, by the term "vertically" being meant the direction rising perpendicularly to the supporting plane at the base of buffer 2 along which the corresponding receiving opening 4 and delivery opening 6 are respectively located. On the other hand sections 8c, 8d run in a "horizontal" direction, that is to say parallel to the plane supporting buffer 2.

Each container element 7 comprises a plurality of supporting planes, each indicated by 9, one above the other and spaced apart with a regular spacing and capable of receiving one or more ranks of products arriving from conveyor means 5. The said container elements 7 are sequentially conveyed along path 8 (in a clockwise direction as viewed in FIG. 1) to carry each container 7 which has to be filled to opening 4 so that the ranks of products P fed to the buffer can be loaded onto planes 9, and to convey previously filled containers 7 to delivery opening 6 in order to release products P leaving the buffer.

In path 8 vertical section 8a represents the ascending section in which containers 7 are loaded while section 8b is the descending section in which containers are discharged. Section 8c is the section in which containers 7 are accumulated, along which these are held side by side while lower section 8d represents the section in which containers 7 from which products P have already been emptied along section 8b are transferred and accumulated while awaiting being again conveyed along ascending section 8a and filled.

Device 1 further comprises means for driving container elements 7 to move them along the sections of path 8. It will be noted that the active drive means along sections 8a and 8b are structurally and functionally similar to each other, and where appropriate the description below will be restricted to those provided in ascending section 8a, it being intended that corresponding drive means be provided for descending section 8b (details common to the aforesaid two vertical sections being where necessary identified by the same reference numbers). Likewise, drive means which are structurally and functionally similar to each other are provided along accumulation sections 8c and 8d, and in this case the description will be restricted to only accumulation section 8c, details common to these two sections of the path being identified by the same reference numbers where this is considered appropriate.

The drive means provided for moving containers 7 along section 8a comprise separate first and second control means, indicated as a whole by 10, 11, respectively sequentially associated with one container 7 or another of each pair of containers arranged in succession which can be identified in accumulation buffer 2. In other words containers 7 which are consecutive to each other along the path and which enter section 8a are driven in sequence by drive means 10, 11 respectively, so that each of these containers 7 is conveyed from and towards receiving opening 4 in separate movements. This configuration of control means 10, 11 is of the type described in international application WO2004/087543, which is to be understood to be integrally incorporated in respect of every detail mentioned herein and not explicitly described in detail, these means not however comprising the specific object of the invention claimed in this patent application. It follows that with regard to any feature which is already described in the prior PCT application and only mentioned here, for a full and exhaustive understanding reference should be made to the description and drawings in the above-mentioned prior application. First control means 10, 11 respectively comprise one or more pairs of motor-driven chains passed around corresponding toothed drive and return wheels, the operating sections of which run parallel to ascending section 8a. A servomotor (not shown) is provided for synchronous control of the chain drive wheels. Each pair of chains is also provided with corresponding engaging means, indicated as a whole by 16, which can engage corresponding engaging counter-means 17 provided on the opposite sides of containers 7 to raise the same along ascending section 8a of buffer 2.

Similarly, drive means 11 in turn comprise one or more pairs of driven chains passed around corresponding toothed drive and return operating sections the wheels of which also run parallel to ascending section 8a. A servomotor, which is also not shown, is provided for synchronous control of the chain drive wheels. The latter are also provided with engaging means structurally identical to engaging means 16 which can engage counter-engaging means 17 provided on the opposite sides of containers 7 to raise them along ascending section 8a. The aforesaid engaging means are attached to the chains at regular intervals, conveniently identical to that provided for engaging means 16.

The drive means provided along descending section 8b comprise first and second drive means which are structurally and functionally identical to those provided on ascending section 8a. These also comprise one or more pairs of driven chains, for a detailed description of which reference should be made to that in respect of the control chains for section 8a, through which consecutive containers 7 entering descending section 8b are moved from and towards delivery opening 6 in movements which are independent of each other.

Drive means, indicated as a whole by 42, which are capable of conveying containers 7 (filled with product P) side by side in succession into the collection position are provided for moving containers along section 8c. The said means comprise pairs of driven chains passed around drive and return wheels, the operating sections of which extend horizontally along section 8c. The said chains are of the type described in previous application WO2004/087543 and reference should be made thereto for construction details not expressly mentioned.

Similarly corresponding drive means, indicated as a whole by 50, having a structure substantially identical to that of drive means 42 are provided for moving containers 7 along lower transfer section 8d. These also include pairs of driven chains with idling rollers supporting the containers, for a detailed description of which reference is made to that for aforesaid drive means 42.

51 indicates a container transfer device, which is in itself conventional (and only diagrammatically represented), provided to transfer each container 7 along path 8 from ascending section 8a to accumulating section 8c and from descending section 8c to lower section 8d.

Similarly, 61 indicates a container disengaging device, which is in itself conventional (and only illustrated diagrammatically), provided to move each of the containers from upper section 8c to descending section 8b and from lower section 8d to ascending section 8a.

Pusher means, indicated as a whole by 70, which are capable of displacing ranks of products from each supporting plane 9 in corresponding container 7 being discharged to a conveyor belt 69, the latter being provided to feed the ranks of products to the subsequent stages of processing in the system downstream from buffer 2, are provided to discharge products P from containers 7 leaving buffer 2.

Pusher means 70 comprise a pair of pusher elements 71, 72, each pusher element being capable of moving towards and away from corresponding container 7 passing along descending section 8b to delivery opening 6 in a direction transverse to the path along which the container moves so as to engage each supporting plane 9 in the container in sequence and push products P out of the container onto belt 69.

According to a principal characteristic of the invention, each of pusher elements 71, 72 is further guided to move along a direction substantially parallel to the vertical direction of movement of container 7 along section 8b so that it can follow the container during the discharge stage over at least parts of its path when it moves in that direction.

More particularly, pusher element 71 comprises a section 71a (capable of interfering transversely with the rank of products) mounted at the extremity of a pusher shaft 71b slidably guided within a frame structure 71c. The direction of movement (indicated by X) is perpendicular to the direction of movement, indicated by Z, of the container along discharge section 8b.

The servomotor 71d for moving pusher shaft 71b is mounted on frame 71c. Said frame 71c is in turn guided so as to move on a stationary structure of buffer 2 incorporating a pair of opposite vertical uprights 80a, b in which the guides for frame 71c are provided. A servomotor 81 is mounted on the stationary structure and is used to control frame 71c in vertical movement along a direction Z' which is therefore parallel to that of the descending movement of the container along section 8b.

Pusher element 72 is structurally and functionally identical to pusher 71. This comprises a section 72a (capable of interfering transversely with the rank of products) mounted at the extremity of a pusher shaft 72b guided to move within a frame structure 72c. The direction of movement X is perpendicular to the direction of movement Z of the container along discharge section 8b. A servomotor 72d for moving the pusher shaft is mounted on frame 72c. Frame 72c is also guided to move on the pair of opposite vertical uprights 80a, b. A servomotor 82 is mounted on the stationary structure and is used to control frame 72c in vertical movement in the Z' direction, which is also parallel to the descending direction of movement of the container along section 8b.

It follows that pusher elements 71, 72 can therefore be moved in the X direction independently of each other towards and away from corresponding container 7 which is being discharged and are also guided so as to move with movements which are independent of each other in the Z' direction parallel to the direction Z of the descending movement of the container being unloaded along section 8b.

As a consequence each pusher 71, 72 follows a first course parallel to the X direction close to container 7 until it engages its corresponding supporting plane 9 to push products P loaded thereon onto discharge belt 69 and subsequently follows a second return course away from the container to disengage from the plane which has been emptied of products to reach a withdrawn position at a distance from the container. During the movements along the aforesaid courses each of pusher elements 71, 72 may also undergo movement in the Z' direction perpendicular to the X direction with the functional advantages which will be described in detail below with particular reference to the operating stages of discharging products. Discharge conveyor belt 69 which receives products leaving buffer 2 is conveniently selected to be of the tilting type. This has an active section 69a extending between opposite longitudinal extremities 69b, 69c, extremity 69c of which, located in a more distal position with respect to container 7, is hinged about a tilting axis Y running transverse to the longitudinal direction of the belt. As a consequence the other extremity 69b, which is more proximal to the container, can be moved along a predetermined path following tilting of the belt such as to cause the belt to move relatively with respect to the container to line up extremity 69b with a preselected supporting plane 9 in the container being discharged, the said plane 9 being engaged by one of pusher elements 71, 72 to discharge products P.

75 illustrates a further discharge belt associated with belt 69, downstream of the latter, this belt having an active section which undergoes only translational movement designed to link the transport of products from belt 69 to the part of the system located downstream from buffer 2.

FIGS. 8 to 13 illustrate the functional operating stages which are repeated cyclically and sequentially in order to achieve complete discharge of each container 7 which is aligned with delivery opening 6 in descending section 8b of the buffer during the discharge stage. For clarity, one reference axis (indicated by W in the figures) which is stationary with respect to buffer 2 is shown in each figure, and the respective relative movements of container 7, pusher elements 71, 72 and tilting discharge belt 69 are considered with respect to this. For further clarity the ranks of products located on the planes of the container have been numbered from the top supporting plane as R1, R2, R3, R4, . . . , R10, and the corresponding supporting planes are identified as P1, P2, P3, . . . , P10. The distance between two consecutive planes in the container is identified by the spacing Q.

Figure 8:
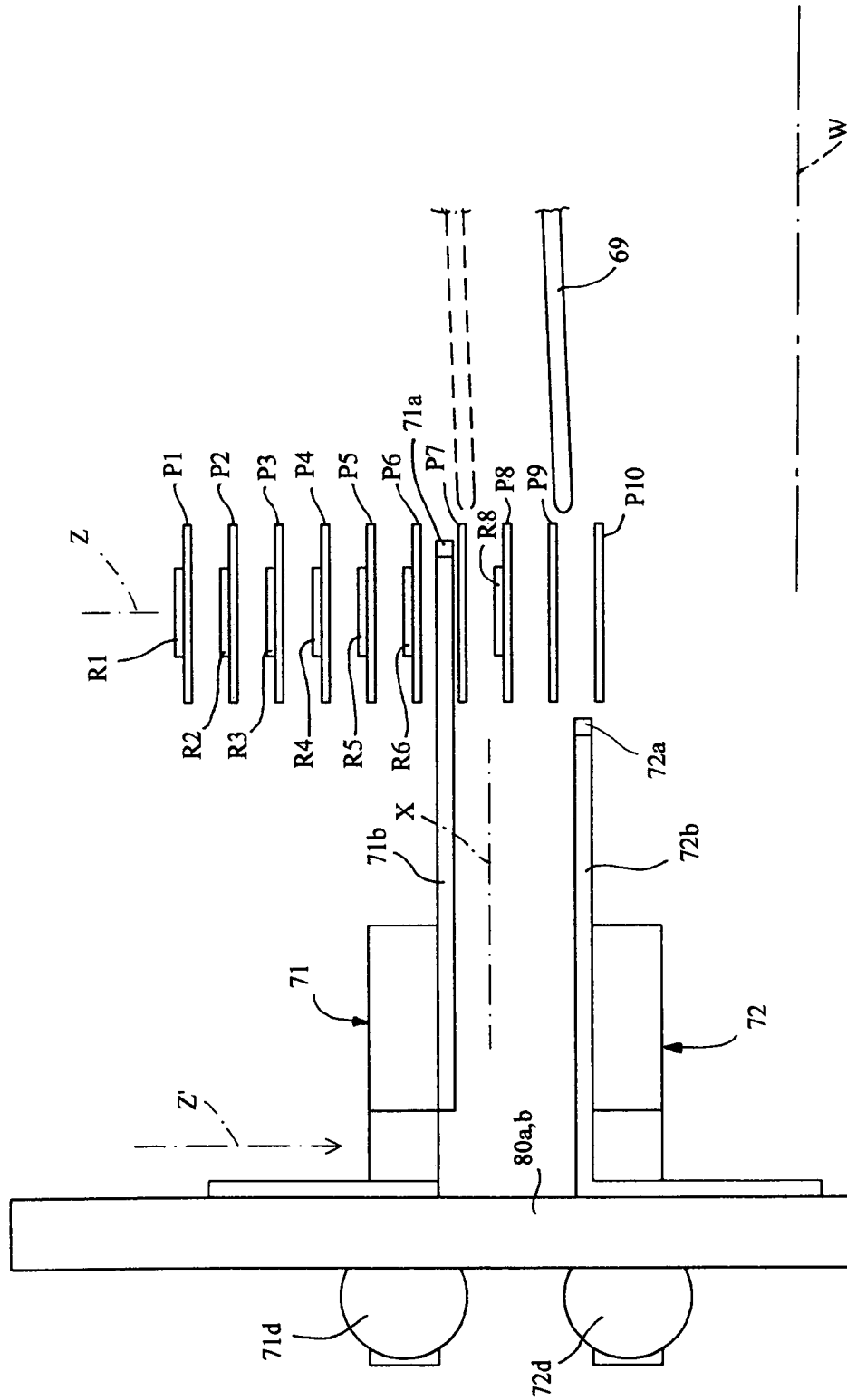
FIGS. 8 to 13 are diagrammatical views of corresponding sequential operating stages in the functioning of a detail of the device in the preceding figures.
Figure 9:
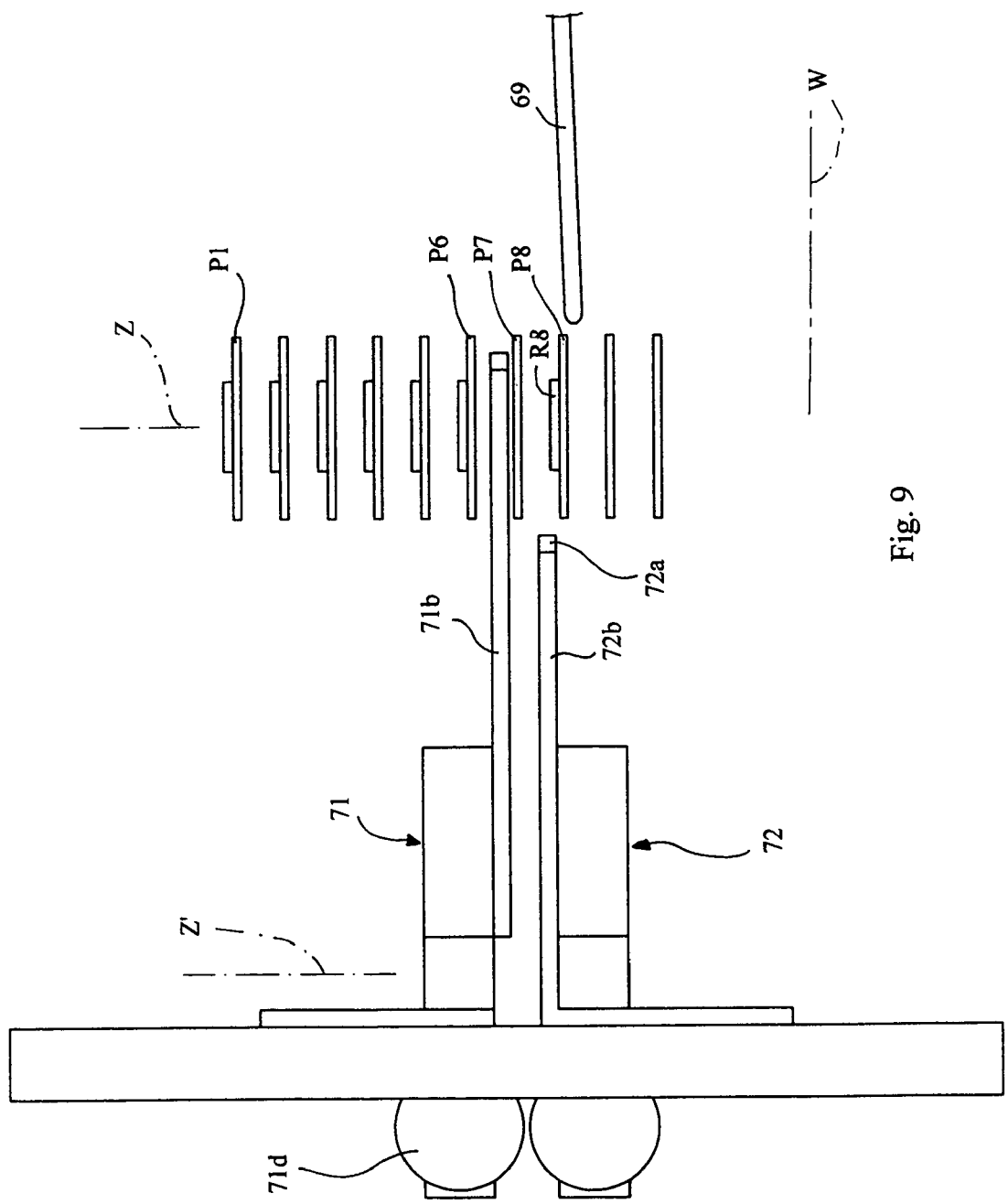
Figure 10:
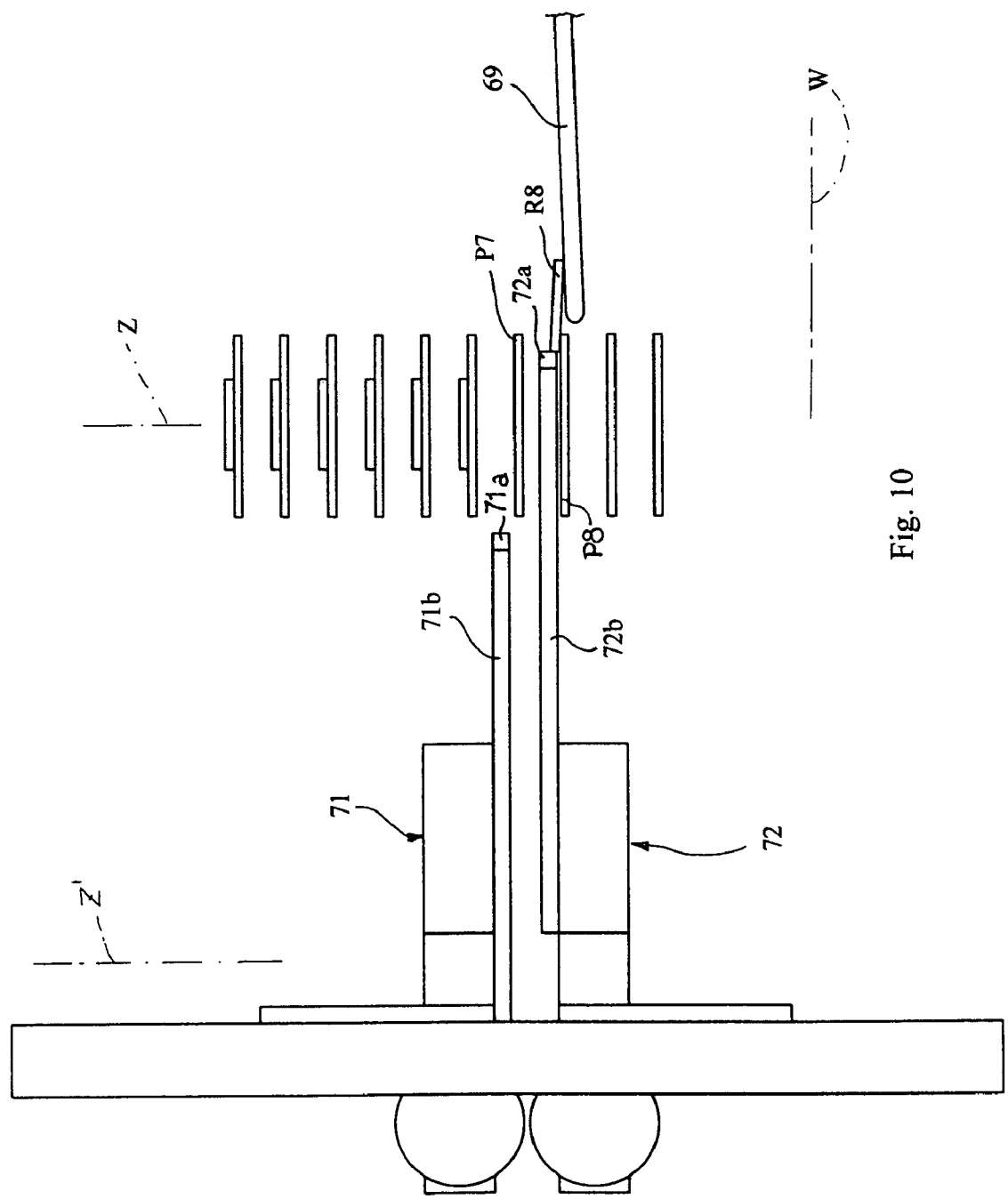

During the operating stage illustrated in FIG. 8, upper pusher 71 is shown at the end of its outward course (in the X direction) after it has engaged plane P7 and has discharged rank R7 onto belt 69 (whose position is indicated by a dashed line).

From the configuration in FIG. 8, container 7, and together therewith pusher 71, are moved downwards in the Z' direction through a course Q while at the same time lower pusher 72 is moved upwards through a course Q as belt 69 is tilted so that extremity 69b lines up with plane P8. Having reached the position in FIG. 9, pusher 72 is moved in the X direction towards container 7 until it interferes with rank R8 to move the latter onto belt 69. At the same time (FIG. 10) pusher 71 is withdrawn along a return course (in the X direction) to disengage from plane P7 which has previously been emptied. It will be noted that from the position in FIG. 8 the pushers are moved towards each other in the Z' direction to the configuration in FIG. 9.

Figure 11:
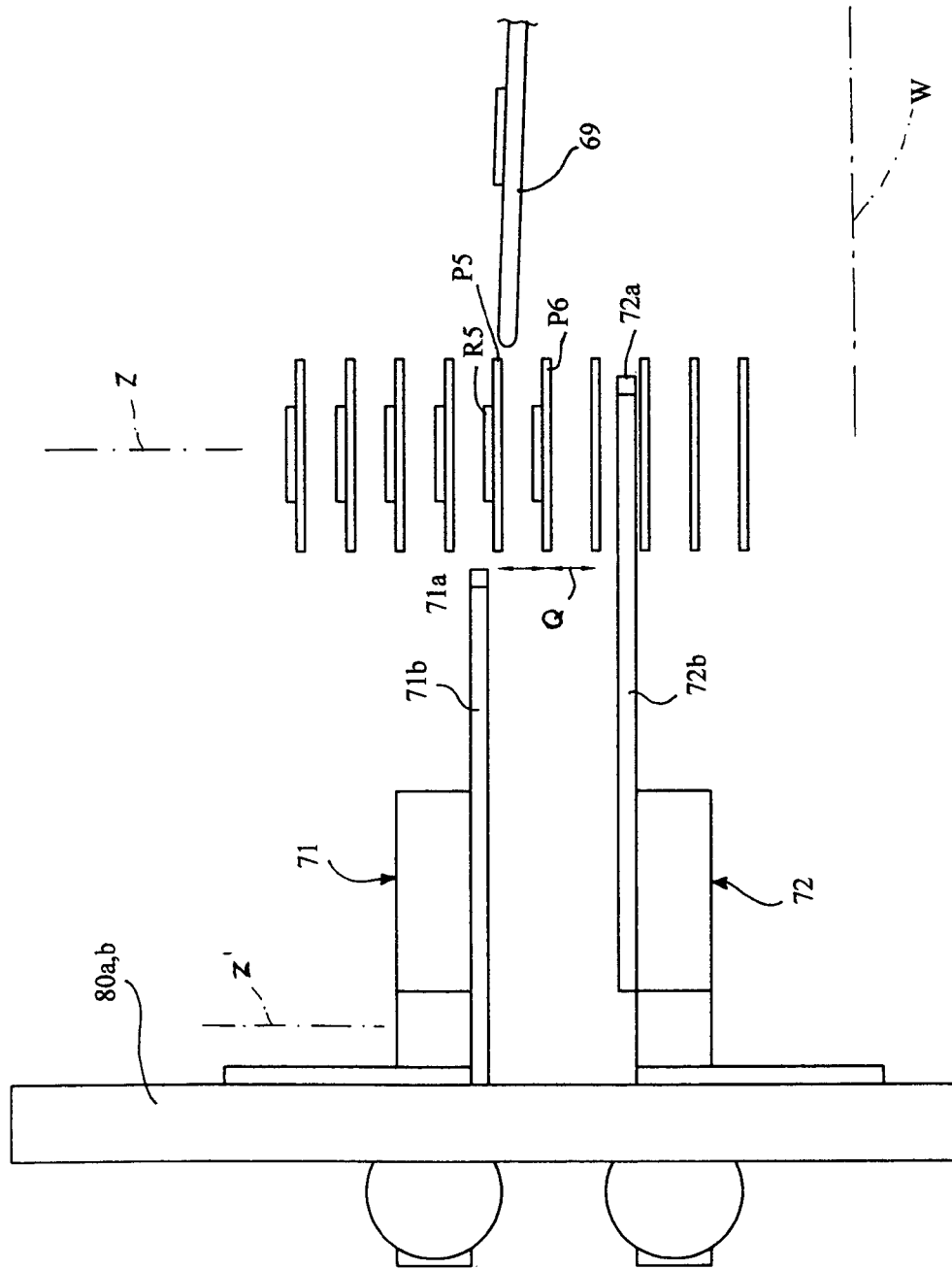
Figure 12:
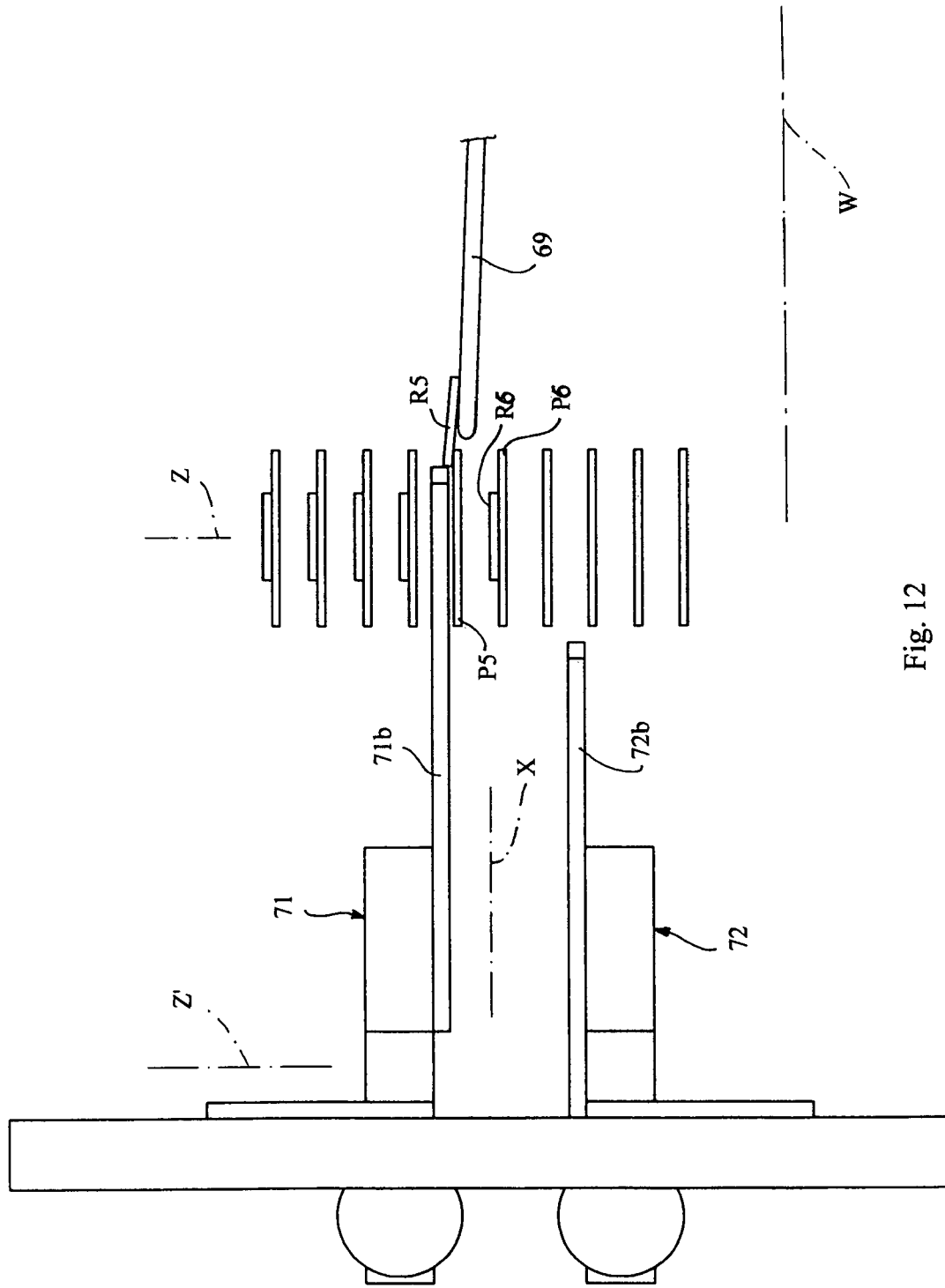
Figure 13:
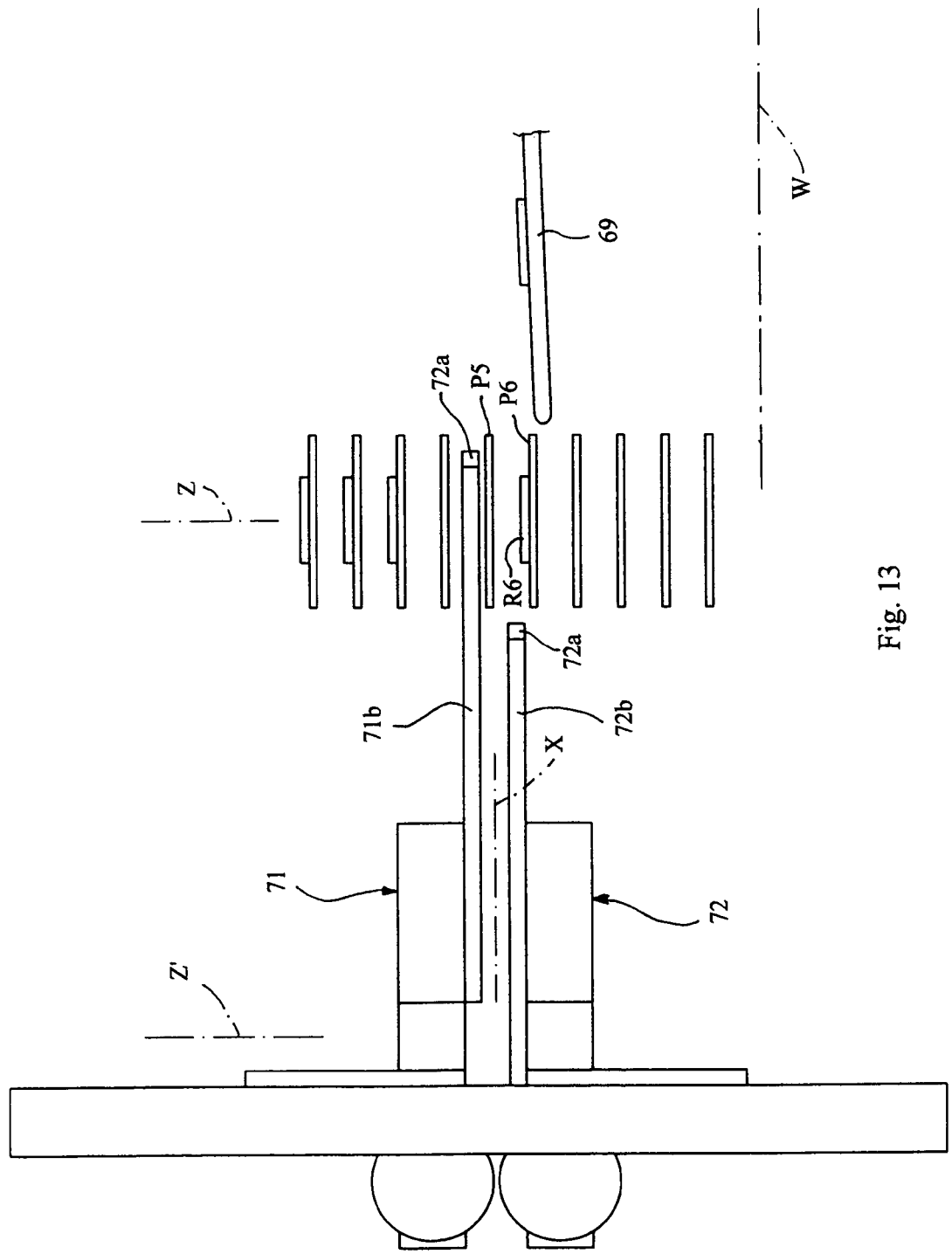

Once rank R8 has been discharged, container 7, and together therewith also pusher 72, is moved downwards along a course Q while at the same time pusher 71 is moved upwards by a similar course Q as belt 69 is tilted until the configuration in FIG. 11 is achieved, where pusher 71 is in line with plane P5 and extremity 69b of the belt. From this position plane P5 is discharged through forward movement (X axis) of pusher 71 and rank R5 is fed to belt 69. During this stage (FIG. 12) lower pusher 72 is withdrawn from plane P8 which was previously emptied and is moved to a position away from the container. Once discharging of plane P5 is complete container 7 is further moved downwards along a course Q. In this course upper pusher 71 (held in the withdrawn position) is moved integrally with container 7 along that course Q. At the same time lower pusher 72 is raised (along Z') along the same course Q as belt 69 is tilted downwards. In the position reached after course Q, shown in FIG. 13, lower pusher 72 is lined up with plane P6 and extremity 69b of belt 69. In this condition rank R6 is discharged through the action of pusher 72 engaging plane P6 and the rank is consequently moved onto belt 69. At the same time upper pusher 71 is withdrawn from plane P5 to disengage therefrom and take up a position at a distance from the container. From this configuration, which reflects that in FIG. 9, the previously described sequence is repeated and after a suitable number of repeated operating cycles this results in complete emptying of the remaining supporting planes P1-P4 in the container.

It should be noted first of all, that each of pusher elements 71, 72 follows the container alternately one after the other during course Q by the container, remaining together with the container in the translational movement. This advantageously means that it is not necessary to wait for completion of the pusher's extraction course (from the plane previously engaged) in order to initiate emptying of the subsequent supporting plane. This further means that because two pushers guided in motion according to the invention are present, the corresponding discharging pusher can be immediately activated after each individual movement Q of the container and once discharge has taken place no waiting time (with the container stationary) is required in order to permit extraction of the pusher, the container being immediately moved along a subsequent course Q at the end of which, being in line with the discharge plane, the other pusher can be activated to push the rank out of the buffer. In other words, with the extraction device according to the invention each movement of the container along course Q is followed only by the time for discharging the container without any further time required for extraction of the pusher from the emptied plane and repositioning thereof, all of which increases the discharge rate which can be achieved from buffer 2.

According to a further characteristic of the invention, it is provided that conveyor means 5 for ranks P feeding buffer 2 at receiving opening 4 can adopt different configurations, all designed to increase the rate of feeding products during the stage of feeding the buffer.

A first preferred configuration provides that the conveyor means for the buffer comprise at least a belt 90 of the tilting type.

This has an active section 90a extending between opposite longitudinal extremities 90b, 90c, extremity 90b of which, located in a more distal position with respect to container 7 (during the loading stage, corresponding to feed opening 4) is hinged about a tilting axis Y' running transversely to the longitudinal direction of the belt. As a consequence the other extremity 90c, which is closer to the container, can be moved following tilting of the belt along a predetermined course such as to move the belt relative to the container in order to line up that extremity 90b with a corresponding extremity of one of pairs of fixed belts 95, 96 located between tilting belt 90 and container 7 which is being loaded. By the term fixed belt is meant belts having active sections (on which products are moved) which are only subject to translational movements. Fixed belts 95, 96 therefore have corresponding active sections 95a, 96a which engage in exclusively lateral forward movement and are designed to have their corresponding extremities 95b, 96b (distally with respect to the container) capable of being aligned with the extremity 90c of belt 90 through appropriate tilting of the latter, and an opposite extremity 95c, 96c (that proximal to the container) which can be lined up with a corresponding supporting plane 9 in container 7 while it is being filled, the said plane being filled by a rank of products pushed by friction onto the same by the forward motion of corresponding belt 95, 96.

Figure 14:
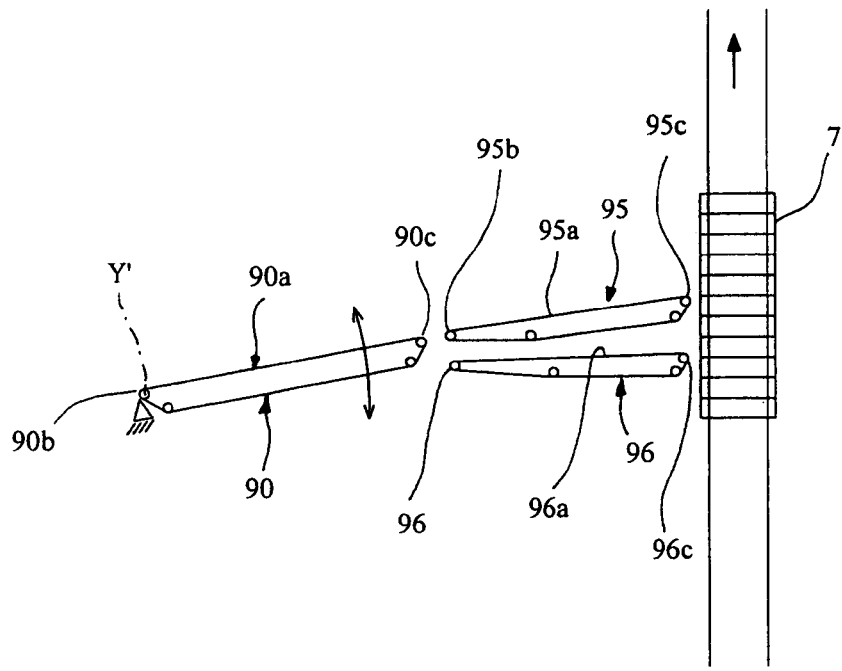
FIGS. 14 and 15 are diagrammatical views in lateral elevation of details of the device according to the invention in corresponding embodiments.

With this configuration it is possible to distribute the number of ranks fed at a particular rate to one or other of belts 95, 96 reducing the loading time required for filling a container 7, thus increasing the loading rate of buffer 2. When in operation a rank of products arriving on belt 90 is moved onto belt 95, while the subsequent rank is moved to belt 96 (through tilting of belt 90 to line up with one or other of belts 95, 96 alternately). FIG. 14 illustrates such a configuration diagrammatically.

The abovementioned belt configuration illustrated in FIG. 14 may also be provided, as an alternative to belt 69, at delivery opening 6, as the conveyor means for discharging ranks of products from the buffer.

Figure 15:
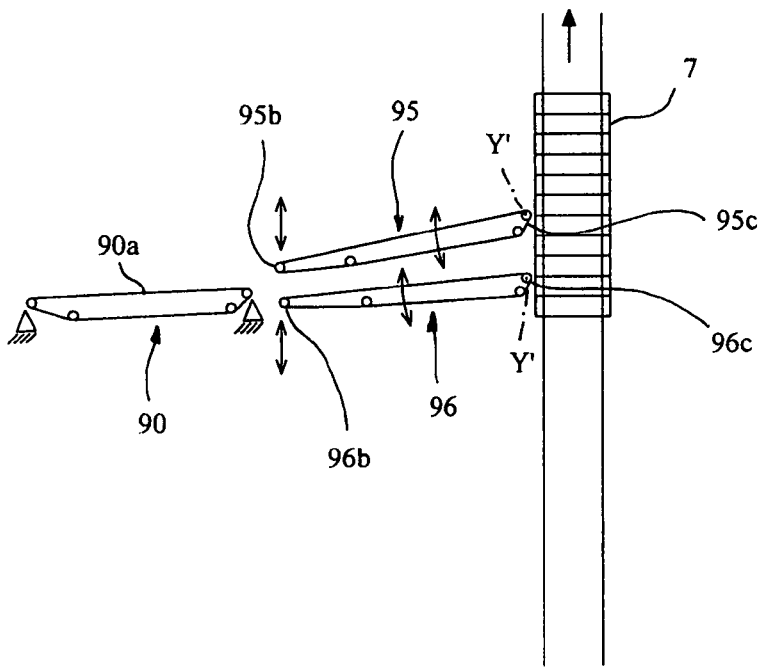

Returning to conveyor means 5, in another alternative to the configuration in FIG. 14 it may be provided that belt 90 is configured as a fixed belt, having only the active section undergoing translational movement, while the two belts 95, 96 are selected to be of the tilting type. These may be hinged at the extremities 95c, 96c closest to the container, permitting the other opposite end 95b, 96b to tilt so as to line up with extremity 90c of belt 90 alternately. This variant is shown in FIG. 15.

It should be understood that the number of fixed and/or tilting belts associated with the receiving opening of the buffer can vary according to the specific requirements of the system, in particular in order to achieve predetermined rates or specific levels of efficiency of accumulation, the possible configurations all however being related to the construction concepts expressed with reference to the variants described above.

The invention thus accomplishes the stated purposes providing the many advantages listed with respect to known arrangements.

Particular mention should be made of the advantage associated with the fact that through the device for discharging the buffer according to the invention with a double pusher following the container being unloaded, the time required for discharge is effectively reduced with a consequent increase in the rate of release of products from the buffer.

Another advantage also lies in the increased buffer filling rate achieved through the system of conveyor means provided in relation to the feed opening to the buffer.

Another advantage also lies in the fact that at the exit from the buffer discharge of products (carried out by the pushers) independently of each other can be achieved through the double pusher according to the invention (the pushers acting in sequence with one another) so as also to permit two packaging machines which are independent of each other downstream from the buffer to be fed.

Yet another advantage is that of being able to achieve the discharge of ranks of products leaving the buffer, already offset by 180°, that is with ranks of products discharged onto the outgoing belt already regularly spaced apart, through the device according to the invention.

The invention claimed is:

1. A device for the accumulation and release of products (P) arranged in ranks, of the type comprising:
   an accumulation buffer (2) with corresponding openings for receipt (4) and delivery (6) of the products (P),
   a plurality of container elements (7) guided so as to move between said receiving and delivery openings (4, 6) within said buffer (2), each container element (7) being provided with a plurality of supporting planes (9) in order to hold ranks of products (P), drive means (10, 11, 42, 50) for said container elements (7) to control movement of said containers within the accumulation buffer (2) so as to present each container element (7) which has to be filled at the receiving opening (4) in sequence so that ranks of products (P) arriving at the corresponding supporting planes (9) of the container can be loaded, and conveying containers (7) previously filled with products (P) to the delivery opening (6) for the corresponding release of ranks of products leaving the accumulation buffer (2), and pusher means (70) provided at the delivery opening (6) capable of moving the ranks of products from each supporting plane (9) in a corresponding container (7) onto conveyor means (69) for discharging products (P) from the buffer (2), the pusher means comprising a plurality of pusher elements (71, 72) which can be moved towards and away from the corresponding container (7) being discharged in a direction transverse to the path of the container's movement, to engage each supporting plane (9) in the container in sequence and push the products (P) out of the container onto the discharge conveyor means (69), characterised in that said plurality of pusher elements (71, 72) of the pusher means (70) are further guided so as to move along a direction substantially parallel to the direction (Z) of movement of the container (7) close to the delivery opening (6) in order to be able to follow the container (7) during the discharge stage for at least parts of the path along which it moves in that direction, wherein the plurality of pusher elements (71, 72) can be independently moved perpendicularly to the direction (Z) of movement of the container (7) being discharged at the delivery opening along a first course approaching the container to push the products (P) in each rank onto the discharge conveyor means (69), and along a second course away from the container to disengage from the supporting plane (9) emptied of products, the plurality of pusher elements being capable of moving parallel to the direction of movement (Z) of the container during the discharge stage at the same time as it moves along at least part of the first and/or second course.

2. A device according to claim 1, in which first control means (71d, 72d) are provided for each pusher element (71, 72) to move the latter towards and from the corresponding container (7) being discharged, perpendicular to the direction of movement of the container, and second separate control means (81, 82) to control movement of the same parallel to the direction of movement (Z) of the container (7) being discharged at the delivery opening (6).

3. A device according to claim 1, in which the conveyor means (69) onto which the ranks of products (P) are transferred on being discharged from the buffer (2) through the pusher means (70) are of the tilting type.

4. A device according to claim 3, in which the conveyor means comprise at least one conveyor belt (69) with an active section (69a) occupied by ranks of products discharged from each supporting plane (9) by means of the pusher means, the section extending between the opposite longitudinal extremities (69b, 69c) of the belt, the extremity (69c) of the length of belt most distal from the container (7) during the discharge stage being hinged about a tilting axis (Y) transverse to the longitudinal direction of the belt so that the other extremity (69b) of the section of belt proximal to the container is capable of moving along a predetermined path according to the tilting induced in the belt to follow the movement of the container during the discharge stage in its path to the delivery opening (6) in order to line up with a preselected supporting plane (9) in the container being discharged which is engaged by pusher means (70) to discharge products (P) from the plane.

5. A device according to claim 4, in which the path of the extremity (69b) of the active section (69a) of the belt following tilting thereof is selected in such a way that the extremity can line up in sequence with one or other of the pusher elements (71, 72) and with each of the supporting planes (9) in the container one at a time to feed each corresponding rank present on each corresponding supporting plane of the container being discharged onto the discharge belt (69).

6. A device according to claim 3, in which provision is made downstream of the discharge conveyor means for a further belt (75) collecting the ranks of products released from the buffer (2) arriving from the conveyor means, the belt having an active section for transport of the product subject to solely translational movement.

7. A device according to claim 1, in which conveyor means feeding the buffer are provided to deliver sequences of ranks of the products to the feed opening so as to sequentially load the supporting planes (9) in the container (7) being loaded conveyed close to the feed opening (4), the conveyor means comprising at least one conveyor belt (90) of the tilting type.

8. A device according to claim 7, in which the at least one tilting belt (90) comprises an active section (90a) extending between a first (90b) and a second opposite extremity (90c), the first extremity (90b) more distal from the container being loaded associated therewith being hinged about a tilt axis (Y'), the second extremity (90c) capable of being tilted through a predetermined angular course, at least one pair of conveyor belts (95, 96) having corresponding active sections (95a, 96a) engaged in translational movement being located between the at least one tilting belt (90) and the container (7), each belt in the pair having corresponding opposite extremities (95b, 95c and 96b, 96c), one of which (95c, 96c) is capable of being lined up with a supporting plane (P) in the container being loaded, the other extremity (95b, 96b) being lined up with the tilting extremity (90c) of the tilting belt (90) following predetermined tilting of the tilting belt.

9. A device according to claim 8, in which at least two conveyor belts (95, 96) of the tilting type are provided, each of these having a corresponding extremity contiguous with the container (79) being loaded which is hinged about a tilting axis (Y'), the other extremity being capable of being tilted through a predetermined angular course, the device comprising a further feed belt (90) with an active section undergoing only translational movement located upstream from the pair of tilting belts (95, 96) and having one extremity which is capable of being lined up with one or other of the tilting extremities of the respective tilting belts so that the ranks of products which have to be fed to the buffer arriving on the fixed belt are loaded into the container being loaded alternately through one or other of the tilting belts.

10. A device according to claim 1, in which the conveyor means on which the ranks of products are transferred on being discharged from the buffer (2) comprise at least one tilting belt (90) with an active section (90a) extending between a first (90b) and a second opposite extremity (90c), the first extremity (90b) more distal from the container being discharged associated therewith being hinged about a tilting axis (Y), the second extremity (90c) being capable of being tilted through a predetermined angular course, at least one pair of conveyor belts (95, 96) having corresponding active sections (95a, 96a) undergoing translational movement being located between the at least one tilting belt (90) and the container (7), each belt in the pair having corresponding opposite extremities, one of which (95c, 96c) is capable of being lined up with a supporting plane (9) in the container being unloaded, the other extremity (95b, 96b) being lined up with the tilting extremity (90c) of the tilting belt (90) following predetermined tilting of the tilting belt.

11. A device for the accumulation and release of products (P) arranged in ranks, of the type comprising:
an accumulation buffer (2) with corresponding openings for receipt (4) and delivery (6) of the products (P),
a plurality of container elements (7) guided so as to move between said receiving and delivery openings (4, 6) within said buffer (2), each container element (7) being provided with a plurality of supporting planes (9) in order to hold ranks of products (P),
drive means (10, 11, 42, 50) for said container elements (7) to control movement of said containers within the accumulation buffer (2) so as to present each container element (7) which has to be filled at the receiving opening (4) in sequence so that ranks of products (P) arriving at the corresponding supporting planes (9) of the container can be loaded, and conveying containers (7) previously filled with products (P) to the delivery opening (6) for the corresponding release of ranks of products leaving the accumulation buffer (2),
pusher means (70) provided at the delivery opening (6) capable of moving the ranks of products from each supporting plane (9) in a corresponding container (7) onto conveyor means (69) for discharging products (P) from the buffer (2), the pusher means comprising at least one pusher element (71, 72) which can be moved towards and away from the corresponding container (7) being discharged in a direction transverse to the path of the container's movement, to engage each supporting plane (9) in the container in sequence and push the products (P) out of the container onto the discharge conveyor means (69), characterised in that said at least one pusher element (71, 72) of the pusher means (70) is further guided so as to move along a direction substantially parallel to the direction (Z) of movement of the container (7) close to the delivery opening (6) in order to be able to follow the container (7) during the discharge stage for at least parts of the path along which it moves in that direction, wherein the conveyor means feeding the buffer are provided to deliver sequences of ranks of the products to the feed opening so as to sequentially load the supporting planes (9) in the container (7) being loaded conveyed close to the feed opening (4), the conveyor means comprising at least one conveyor belt (90) of the tilting type, and
at least one tilting belt (90) comprises an active section (90a) extending between a first (90b) and a second opposite extremity (90c), the first extremity (90b) more distal from the container being loaded associated therewith being hinged about a tilt axis (Y'), the second extremity (90c) capable of being tilted through a predetermined angular course, at least one pair of conveyor belts (95, 96) having corresponding active sections (95a, 96a) engaged in translational movement being located between the at least one tilting belt (90) and the container (7), each belt in the pair having corresponding opposite extremities (95b, 95c and 96b, 96c), one of which (95c, 96c) is capable of being lined up with a supporting plane (9) in the container being loaded, the other extremity (95b, 96b) being lined up with the tilting extremity (90c) of the tilting belt (90) following predetermined tilting of the tilting belt.

12. A device according to claim 11, in which at least two conveyor belts (95, 96) of the tilting type are provided, each of these having a corresponding extremity contiguous with the container (79) being loaded which is hinged about a tilting axis (Y'), the other extremity being capable of being tilted through a predetermined angular course, the device comprising a further feed belt (90) with an active section undergoing only translational movement located upstream from the pair of tilting belts (95, 96) and having one extremity which is capable of being lined up with one or other of the tilting extremities of the respective tilting belts so that the ranks of products which have to be fed to the buffer arriving on the fixed belt are loaded into the container being loaded alternately through one or other of the tilting belts.

13. A device for the accumulation and release of products (P) arranged in ranks, of the type comprising:
an accumulation buffer (2) with corresponding openings for receipt (4) and delivery (6) of the products (P),
a plurality of container elements (7) guided so as to move between said receiving and delivery openings (4, 6) within said buffer (2), each container element (7) being provided with a plurality of supporting planes (9) in order to hold ranks of products (P),
drive means (10, 11, 42, 50) for said container elements (7) to control movement of said containers within the accumulation buffer (2) so as to present each container element (7) which has to be filled at the receiving opening (4) in sequence so that ranks of products (P) arriving at the corresponding supporting planes (9) of the container can be loaded, and conveying containers (7) previously filled with products (P) to the delivery opening (6) for the corresponding release of ranks of products leaving the accumulation buffer (2),
pusher means (70) provided at the delivery opening (6) capable of moving the ranks of products from each supporting plane (9) in a corresponding container (7) onto conveyor means (69) for discharging products (P) from the buffer (2), the pusher means comprising at least one pusher element (71, 72) which can be moved towards and away from the corresponding container (7) being discharged in a direction transverse to the path of the container's movement, to engage each supporting plane (9) in the container in sequence and push the products (P) out of the container onto the discharge conveyor means (69), characterised in that said at least one pusher element (71, 72) of the pusher means (70) is further guided so as to move along a direction substantially parallel to the direction (Z) of movement of the container (7) close to the delivery opening (6) in order to be able to follow the container (7) during the discharge stage for at least parts of the path along which it moves in that direction, wherein the conveyor means feeding the buffer are provided to deliver sequences of ranks of the products to the feed opening so as to sequentially load the supporting planes (9) in the container (7) being loaded conveyed close to the feed opening (4), the conveyor means comprising at least one conveyor belt (90) of the tilting type.

* * * * *